Patented Dec. 8, 1953

2,662,066

UNITED STATES PATENT OFFICE 2,662,066

ADHESIVE COMPOSITION COMPRISING A UREA-ALDEHYDE RESIN AND TETRAHYDRAFURFURYL ALCOHOL

Laurence E. Clark, Jr., and Carl F. MacLagan, Bainbridge, N. Y., assignors to The Borden Company, New York, N. Y., a corporation of New Jersey No Drawing. Application October 28, 1947, Serial No. 782,674

2 Claims. (Cl. 260—30.4)

This invention relates in general to urea-aldehyde adhesive compositions, and in particular to such compositions containing a non-crazing agent. The invention is also directed to processes for producing such adhesive compositions.

Urea-aldehyde resin adhesive compositions find wide use in the gluing art, particularly as an adhesive for gluing wood and in the formation of plywood. Such adhesives are water-soluble for the most part, and are therefore relatively inexpensive and lend themselves to a great many operations where an organic solvent is undesirable, especially where manufacturing costs and health hazards are items to be considered. Urea-aldehyde resin adhesives are widely used in industry because they produce a highly water-resistant bond between fibrous materials, such as wood, paper, and the like. Unfortunately, however, acid-cured urea-aldehyde resin adhesives have an inherent weakness in that they tend to crack and craze upon curing, accompanied by a marked deterioration in adhesion, especially where glue lines of appreciable thickness are encountered.

Many attempts have been made to overcome the problem of crazing by a modification of the ingredients employed, or by varying the ratio of the ingredients used to form such adhesives, but such attempts have not been entirely satisfactory, especially when an aqueous solvent is used for dissolving the adhesive. Moreover, when attempts are made to modify the adhesive, the adhesive properties are impaired or the stability or shelf-life is lowered, resulting in an adhesive having inferior gluing properties.

Accordingly, it was a general object of the invention to overcome the crazing and cracking tendencies of urea-aldehyde adhesives while maintaining its adhesive properties.

A further object of the invention is to provide a urea-aldehyde adhesive by adding thereto a non-crazing agent which would minimize the tendency for such adhesive to craze and crack when used as a glue for joining fibrous materials.

Another object of this invention is to improve the durability of the urea-aldehyde adhesive compositions by physically incorporating therewith a substance which would have a slow evaporation rate and which does not entrap aqueous solvents as the adhesive hardens and sets.

Other objects of the invention will in part be obvious and will in part appear hereinafter.

We have found that the crazing and cracking tendencies of urea-aldehyde adhesives may be minimized or entirely eliminated by adding to such adhesive composition a non-crazing agent comprising a furfuryl alcohol. The furfuryl alcohol may be mixed with the dry urea-aldehyde powder prior to, or at the time the powder is mixed with water, or it may be added to the urea-aldehyde liquid adhesive prior to the application of the adhesive to the members desired to be joined together. It has been found that furfuryl alcohol modifies the drying rate of the resin adhesive at the time of its use as a bonding agent. Preferably the non-crazing agent of the class described is added to a liquid urea-formaldehyde resin adhesive which contains 70% solids by weight, but other types of liquid adhesives containing amounts of solids greater or less than 70% may be employed if desired. The amount of furfuryl alcohol non-crazing agent added to the urea-aldehyde adhesive may vary between the limits of 0.1 to 1.0 mol of said non-crazing agent to 1.0 mol of urea. It has been found desirable to physically admix the furfuryl alcohol with the adhesive, i. e., avoid such conditions whereby a chemical reaction might take place between the furfuryl alcohol and the resin adhesive or its components.

Various fillers, catalysts, and the like may be added prior to or after the addition of the furfuryl alcohol to the urea-aldehyde. Such fillers comprise wood flour, walnut shell flour, alpha-cellulose, and the like. Various acid catalysts or acid producing salts which may be added to harden the adhesive composition comprise oxalic acid, ammonium chloride, ammonium sulfate, and the like.

The following examples are given by way of illustrating the invention and not by way of limitation. Unless otherwise stated, all parts given are by weight.

Example 1

To 100 g. of a urea-formaldehyde powdered resin adhesive containing formaldehyde to urea in the molar ratio of 1.5:1 there was added 35 g. of water, 2 g. ammonium chloride, and 35 g. furfuryl alcohol. The adhesive was then applied to one surface of wood and another piece of wood pressed thereto for a period of about 40 minutes under a pressure of about 125 pounds per square inch. After release of pressure it was found that a stable glue line was formed between the two pieces of wood thus pressed. The glue line did not craze or crack upon aging. Gluing tests prepared under British Specification DTD 484 gave excellent results when the glue line thickness of the test specimen was approximately $\frac{1}{32}$ of an inch thick. A further test was made, using the above formula, by pouring the adhesive into a beaker to form a casting. The casting did not crack or craze upon aging.

*Example 2*

To 100 g. of a urea-formaldehyde resin liquid (high viscosity) containing formaldehyde to urea in the molar ratio of 1.7:1, there were added 1.5 g. ammonium sulfate, 30 g. tetrahydrofurfuryl alcohol, and 10.5 g. walnut shell flour. The adhesive was then applied to one surface of wood and another piece of wood pressed thereto for a period of about 60 minutes under a pressure of about 50 pounds per square inch. After release of the pressure it was found that a stable glue line was formed between the two pieces of wood thus pressed, and which glue line did not craze or crack upon aging.

*Example 3*

To 100 g. of a urea-formaldehyde resin liquid (high viscosity) there were added 1.5 g. ammonium sulfate, 33 g. dihydrofurfuryl alcohol, and 10.5 g. walnut shell flour. The adhesive was then applied to one surface of wood and another piece of wood pressed thereto for a period of about 50 minutes under a pressure of about 100 pounds per square inch. After release of the pressure it was found that a stable glue line was formed between the two pieces of wood thus pressed and which did not craze or crack upon aging. Gluing tests on wood indicated that the bond did not craze or crack after aging for several months.

The non-crazing agent of the class described may be used with any urea-aldehyde condensation product or resin adhesive, such as those formed by reacting urea, thiourea, methylurea, acetylurea and the like, with formaldehyde or an aldehyde, such as paraformaldehyde, acetaldehyde, propionaldehyde, crotonaldehyde, benzaldehyde and the like. In the preferred embodiment, there is employed a urea-formaldehyde resin adhesive containing formaldehyde to urea in the molar ratio of from 1 to 2 mols of formaldehyde to 1 mol of urea, but other ratios of formaldehyde to urea may be employed which vary within this range.

A preferred proportion of the furfuryl alcohol is in the mol ratio of about 0.4 of the furfuryl alcohol to about 1.0 of the urea in the resin to which the anti-crazing agent is added.

Numerous advantages have been realized in carrying out the teachings of the present invention. For example, the non-crazing agents comprising the furfuryl alcohols of the class described, in contrast to hygroscopic plasticizers such as glycerol, have a relatively slow rate of evaporation and do not trap water within the resin adhesive, which water weakens the bonding properties. Moreover, the furfuryl alcohol non-crazing agent of the present invention does not form an oily film on the surface of the adhesive as is often encountered when using various known plasticizers, such as tricresyl phosphate.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. An adhesive composition comprising a urea-aldehyde resin and a non-crazing agent comprising tetrahydrofurfuryl alcohol, the mol ratio of said tetrahydrofurfuryl alcohol being within the range between 0.1 to 1.0 mol of tetrahydrofurfuryl alcohol per mol urea in the resin.

2. An adhesive composition comprising a urea-aldehyde resin and a non-crazing agent comprising tetrahydrofurfuryl alcohol, said aldehyde and said urea being in the mol ratio of 1.0–2.0:1, the mol ratio of said tetrahydrofurfuryl alcohol being within the range between 0.1 to 1.0 mol of tetrahydrofurfuryl alcohol per mol of urea in the resin.

LAURENCE E. CLARK, Jr.
CARL F. MacLAGAN.

References Cited in the file of this patent

UNITED STATES PATENTS

| Number | Name | Date |
| --- | --- | --- |
| 2,335,701 | Root | Nov. 30, 1943 |
| 2,431,035 | Goepfert et al. | Nov. 18, 1947 |
| 2,455,392 | Balley et al. | Dec. 7, 1948 |
| 2,518,388 | Simons | Aug. 8, 1950 |